United States Patent
Causey et al.

(10) Patent No.: US 8,766,795 B1
(45) Date of Patent: Jul. 1, 2014

(54) DEVICE AVAILABILITY NOTIFICATION AND SCHEDULING

(75) Inventors: Mark Edward Causey, Tucker, GA (US); Scott Andrus, Prior Lake, MN (US); Adrianne B. Luu, Roswell, GA (US); Kevin W. Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 1291 days.

(21) Appl. No.: 11/934,140

(22) Filed: Nov. 2, 2007

(51) Int. Cl.
*G08B 1/08* (2006.01)
*B60Q 1/48* (2006.01)

(52) U.S. Cl.
USPC ............... 340/539.14; 340/932.2; 340/573.1; 340/3.7; 340/679; 709/203; 700/83

(58) Field of Classification Search
USPC .......... 340/573.1, 286.06, 932.2, 539.14, 3.7, 340/533, 679; 700/83; 709/203; 68/12.01; 379/106.01; 705/418, 13, 1
See application file for complete search history.

(56) References Cited

U.S. PATENT DOCUMENTS

| | | | | |
|---|---|---|---|---|
| 5,586,174 A | * | 12/1996 | Bogner et al. | 379/106.01 |
| 5,680,445 A | * | 10/1997 | Bogner et al. | 379/106.01 |
| 5,774,528 A | * | 6/1998 | Bogner et al. | 379/106.01 |
| 7,469,288 B2 | * | 12/2008 | Tuttle | 709/224 |
| 7,535,367 B2 | * | 5/2009 | Ratnakar | 340/573.1 |
| 2002/0022896 A1 | * | 2/2002 | Dugan | 700/83 |
| 2002/0029164 A1 | * | 3/2002 | Sugar et al. | 705/13 |
| 2002/0047774 A1 | * | 4/2002 | Christensen et al. | 340/3.54 |
| 2002/0080030 A1 | * | 6/2002 | Inomata | 340/542 |
| 2002/0109610 A1 | * | 8/2002 | Katz | 340/932.2 |
| 2002/0109611 A1 | * | 8/2002 | Howard | 340/932.2 |
| 2002/0163444 A1 | * | 11/2002 | Budnovitch | 340/932.2 |
| 2002/0169643 A1 | * | 11/2002 | Petite et al. | 705/5 |
| 2003/0010821 A1 | * | 1/2003 | Silberberg | 235/382 |
| 2003/0112154 A1 | * | 6/2003 | Yoakum et al. | 340/932.2 |
| 2003/0144890 A1 | * | 7/2003 | Dan | 705/5 |
| 2003/0162536 A1 | * | 8/2003 | Panico | 455/422 |
| 2004/0015380 A1 | * | 1/2004 | Timmins | 705/8 |
| 2004/0068433 A1 | * | 4/2004 | Chatterjee et al. | 705/13 |
| 2004/0215517 A1 | * | 10/2004 | Chen et al. | 705/14 |
| 2004/0252034 A1 | * | 12/2004 | Slemmer et al. | 340/932.2 |
| 2004/0254840 A1 | * | 12/2004 | Slemmer et al. | 705/22 |
| 2005/0033634 A1 | * | 2/2005 | Pugliese, III | 705/13 |
| 2005/0108326 A1 | * | 5/2005 | Tuttle | 709/203 |
| 2005/0114167 A1 | * | 5/2005 | McEvoy | 705/1 |
| 2005/0190076 A1 | * | 9/2005 | Howard et al. | 340/932.2 |
| 2005/0215194 A1 | * | 9/2005 | Boling et al. | 455/3.02 |
| 2005/0221806 A1 | * | 10/2005 | Sengupta et al. | 455/414.3 |
| 2005/0280555 A1 | * | 12/2005 | Warner, IV | 340/932.2 |
| 2006/0046740 A1 | * | 3/2006 | Johnson | 455/456.1 |
| 2006/0154657 A1 | * | 7/2006 | Inselberg | 455/418 |
| 2006/0170566 A1 | * | 8/2006 | Slemmer et al. | 340/932.2 |

(Continued)

*Primary Examiner* — Hoi Lau
(74) *Attorney, Agent, or Firm* — Baker & Hostetler LLP

(57) ABSTRACT

An availability notification for a device can be provided to a mobile device. The availability notification can be provided based on a configuration established by a subscriber of a mobile device as well as a characteristic of the mobile device. The subscriber can interact with an interface provided by the network provider to establish the configuration. Additionally, the subscriber can reserve the device via his or her mobile device. For example, a reservation interface may be provided to the subscriber via his or her mobile device that includes reservation options that can be selected by the subscriber to reserve the device. The reservation interface can further include the availability notification that indicates the device is currently available.

19 Claims, 8 Drawing Sheets

(56) References Cited

U.S. PATENT DOCUMENTS

| | | | |
|---|---|---|---|
| 2006/0186197 A1* | 8/2006 | Rosenberg | 235/380 |
| 2007/0008181 A1* | 1/2007 | Rollert et al. | 340/932.2 |
| 2007/0040701 A1* | 2/2007 | Browne et al. | 340/932.2 |
| 2007/0050240 A1* | 3/2007 | Belani et al. | 705/13 |
| 2007/0136110 A1* | 6/2007 | Presley et al. | 705/5 |
| 2007/0202900 A1* | 8/2007 | Inselberg | 455/500 |
| 2007/0241927 A1* | 10/2007 | Ratnakar | 340/825.28 |
| 2007/0290888 A1* | 12/2007 | Reif et al. | 340/932.2 |
| 2008/0010105 A1* | 1/2008 | Rose et al. | 705/5 |
| 2008/0154654 A1* | 6/2008 | Niessen et al. | 705/5 |
| 2008/0291054 A1* | 11/2008 | Groft | 340/932.2 |
| 2011/0099126 A1* | 4/2011 | Belani et al. | 705/418 |

\* cited by examiner

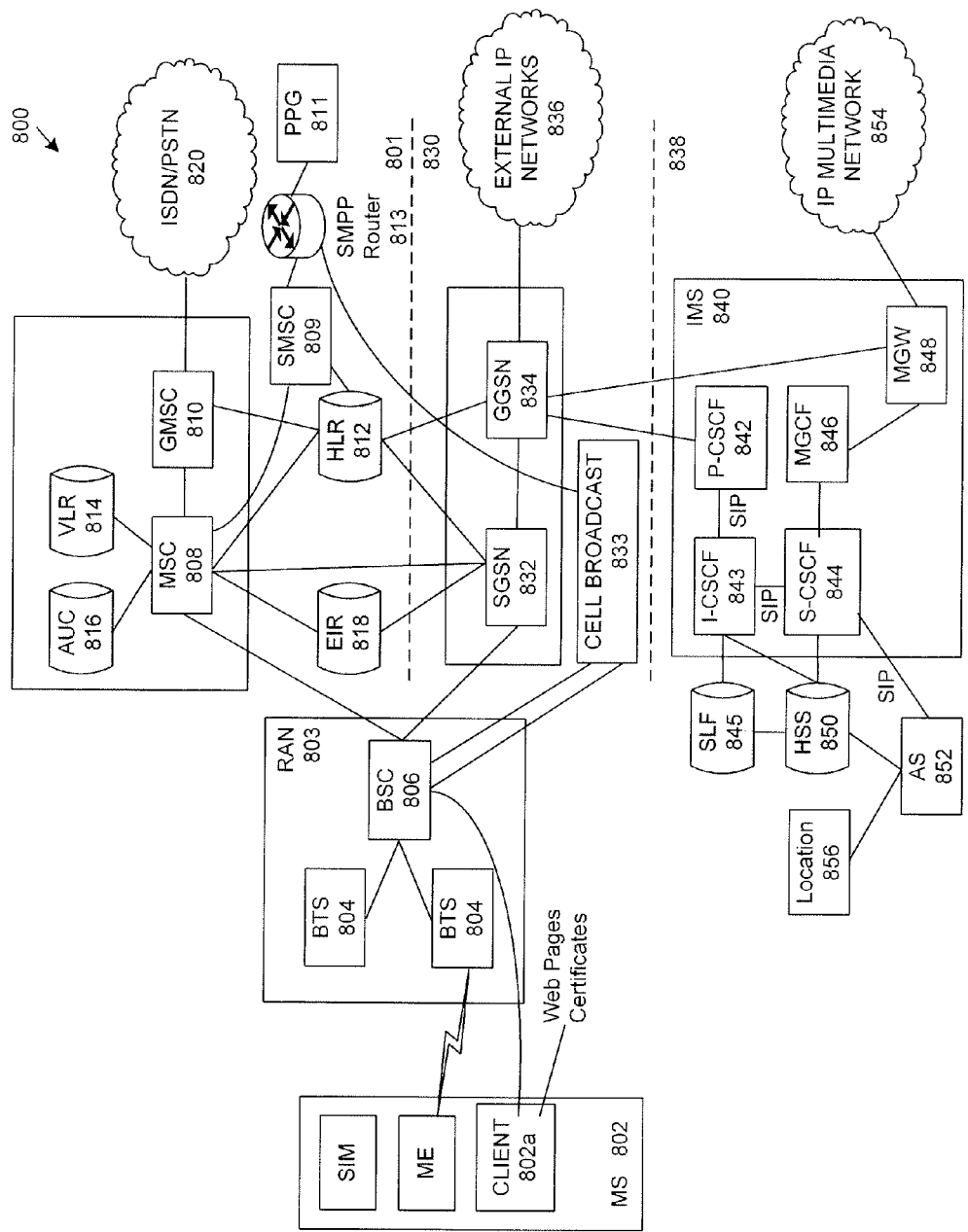

DEVICE AVAILABILITY NOTIFICATION AND SCHEDULING

BACKGROUND

Typically, a user of a device such as a washing machine, a dryer, workout equipment, a parking meter, a computer access terminal, or the like must wait at the location of the device until others have finished using the device. For example, a user such as a student may need to use a washing machine in a Laundromat of his or her dorm room. Such a user may need to wait until other students finish using the available machines in the Laundromat. Because such devices are limited in quantity, the user may need to wait at the Laundromat for long periods of time until a washing machine may become available. Unfortunately, the user may not be able to wait for a long period of time at the device's location for such a device to become available. Additionally, if the user must wait at the device's location, the user may be unable to complete other tasks remote to the device's location.

SUMMARY

Device availability notifications can be provided to a mobile device based on a device configuration and device availability information. For example, a subscriber of the mobile device can provide a device configuration that includes information for one or more devices the subscriber wishes to receive availability notifications from. The notifications of a device's availability can be received by the subscriber's mobile device, based on the device configuration. Additionally, the subscriber can also select to reserve a device. For example, upon receiving a notification that a particular device has become availability, the subscriber can reserve the device.

BRIEF DESCRIPTION OF THE DRAWINGS

The foregoing and other objects, aspects and advantages of configuring EAS alert messages will be better understood from the following detailed description with reference to the drawings.

FIG. 8 illustrates an example alternate block diagram of an exemplary GSM/GPRS/IP multimedia network architecture in which alert messages based on a characteristic and/or configuration can be incorporated.

DETAILED DESCRIPTION OF ILLUSTRATIVE EMBODIMENTS

As will be described herein, availability information for a device can be broadcast based on one or more configurations and characteristics. In an example embodiment, an availability notification can be provided, to a mobile device, based on a configuration established by a subscriber or user of the mobile device using an interface provided by a network provider to an electronic device and/or the mobile device. In another example embodiment, an availability notification can be provided dynamically and/or automatically, to a mobile device, based on a characteristic of the mobile device.

Additionally, as will be described herein, a device may be reserved by a subscriber and/or user of a mobile device. For example, a subscriber can reserve a device via an interface that may be rendered on the subscriber's mobile device. For example, in one embodiment, when a device becomes available, an interface that may include a notification indicating a device's availability can be provided by a network provider to the subscriber's mobile device. The subscriber can then interact with one or more scheduling options provided via the interface to reserve the available device. Additionally, according to an example embodiment, an interface can be provided to a subscriber's mobile device such that the subscriber can reserve a device for future use even though such a device may be currently unavailable.

Figure 1:
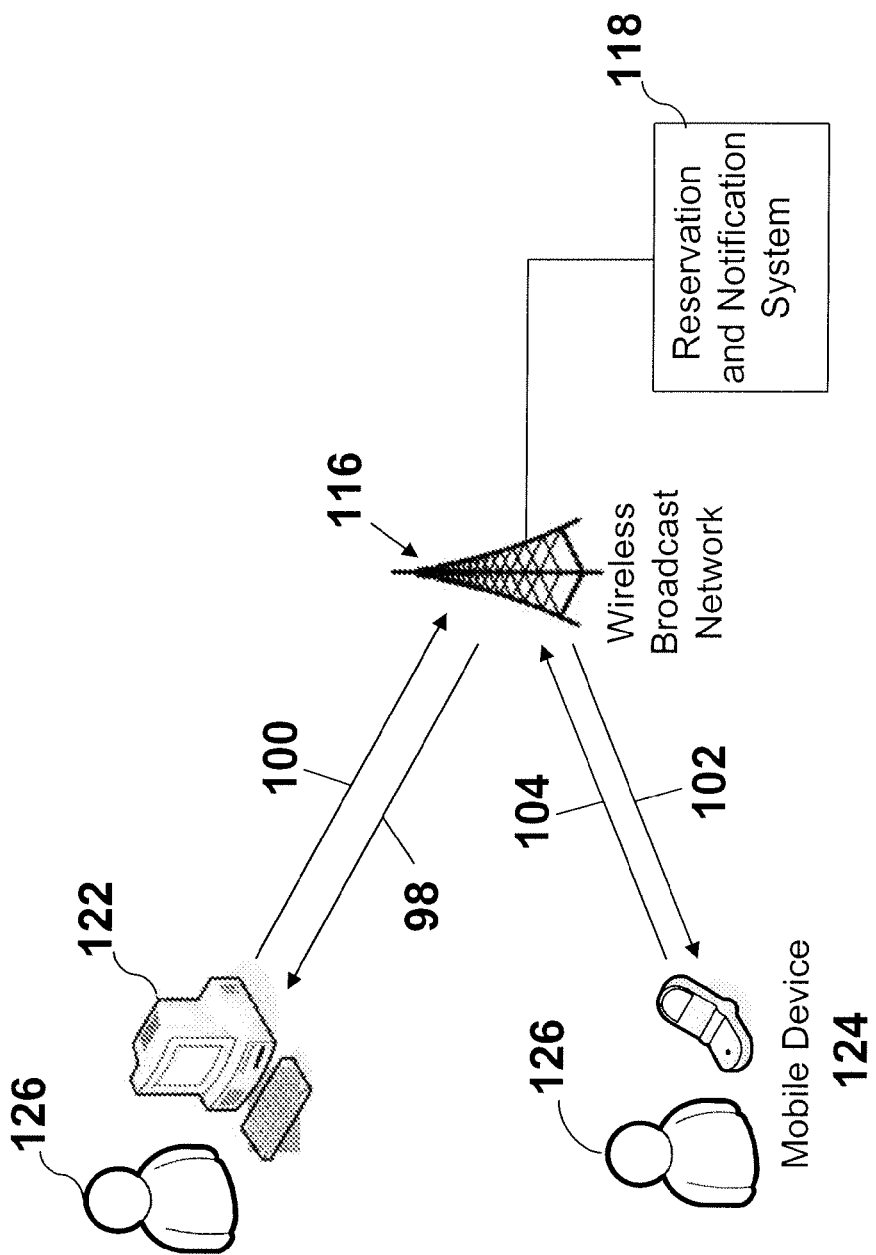
FIG. 1 is a flow diagram of an example system and process for receiving a device configuration and/or a characteristic from a subscriber.

FIG. 1 is a flow diagram of an example system and process for receiving a device configuration and/or a characteristic from a subscriber. In one embodiment, a device configuration can be generated by a subscriber 126 using an electronic device 122. The electronic device 122 can include hardware components such as a processor, a graphics card, a storage component, a memory component, a memory card reader, an antenna, a communication port, a disc drive, or the like. The electronic device 122 can also include software components such as an operating system that can control the hardware components. The electronic device 122 can include any other suitable components such that subscriber can generate a device configuration that includes availability for one or more devices the subscriber elects to receive on his or her mobile device, for example. According to example embodiments, the electronic device can be a computer, a client system, a server, or the like.

At step 98, a configuration interface can be provided to the subscriber 126, via the electronic device 122. For example, the configuration interface can be displayed on the electronic device 122. The configuration interface, which will be described in more detail below, can include one or more devices that can be configured to provide a notification and/or a message regarding the availability or status of such the devices. The subscriber 126 can then interact with the configuration interface to select one or more devices and/or notifications the subscriber wishes to receive on his or her mobile device.

The electronic device 122 can be connected to the reservation and notification system 118 by any wired or wireless technology including Internet connectivity, GSM, CDMA, WiFi, WiMAX, Bluetooth protocol, or the like. Upon selecting the devices and/or notifications, at step 100, the selection can be provided to a reservation and notification system 118. The reservation and notification system 118 can render a device configuration for the subscriber 126 based on the selection. Alternatively, the electronic device 122 can render the device configuration based on the selection. At step 100, the device configuration can then be provided to the reservation and notification system 118, for example.

According to one embodiment, the electronic device 122 can communicate the device configuration and/or the device notification selections to the reservation and notification system 118, at step 100, via a wireless broadcast network 116. The wireless broadcast network 116 can be any type of communication network including the example networks described below in FIGS. 6-8. For example, the wireless broadcast network 116 can include GSM, CDMA, WiFi, WiMax, EDGE, or the like Additionally, the wireless broadcast network 116 can be operated by a network provider. The network provider can offer bandwidth and/or network access to its subscribers to enable communication between subscribers and other users of electronic devices and/or mobile devices such as cellular phones, PDAs, PCs, Voice over Internet Protocol devices, analog telephone devices, or the like.

The wireless broadcast network 116 can include the reservation and notification system 118. The reservation and notification system 118 can include any combination of hardware components such as processors, databases, storage drives, registers, cache, RAM memory chips, data buses, or the like and/or software components such as operating systems, database management applications, or the like. According to an example embodiment, the reservation and notification system 118 can be a network-based server that can provide a configuration interface, a notification interface, and/or a reservation interface to subscribers to receive a reservation option, to receive and/or modify a device configuration, to store such device configurations, and/or to determine whether to provide an availability notification to a specific mobile device.

In one embodiment, the reservation and notification system 118 can receive and store a device configuration for each subscriber indicative of the types of alert messages the subscriber elects his or her mobile device to receive. The reservation and notification system 118 can use the device configuration to determine whether to provide an availability notification received by the wireless broadcast network 116 from a device 120, shown in FIG. 2, to a mobile device of the subscriber, which will be described in more detail below. The reservation and notification system 118 can also determine whether to reserve the device 120, which will be described in more detail below.

Any other suitable component of the wireless broadcast network 116 can also be used to receive and store device configurations for subscribers, determine whether to provide availability notifications for a device to subscribers, and/or to determine whether to reserve the device. For example, the wireless broadcast network 116 can include a Home Location Register (HLR), Mobile Switching Center (MSC), or the like, which will be described in more detail below, that can be used to receive and store device configurations for subscribers, determine whether to provide availability notifications for a device to subscribers, and/or to determine whether to reserve the device.

According to another embodiment, the device configuration can be generated by a subscriber 126 using the mobile device 124. The mobile device 124 can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

At step 102, the configuration interface can be provided to the subscriber 126, via the mobile device 124. For example, the configuration interface can be provided to the mobile device 124 via the wireless broadcast network 116. The mobile device 124 can display the configuration interface to the subscriber 124. The subscriber 126 can then interact with the configuration interface to select one or more devices and/or notifications the subscriber wishes to receive on his or her mobile device.

Upon selecting the devices and/or notifications, at step 104, the selection can be provided to the reservation and notification system 118. As described above, the reservation and notification system 118 can render a device configuration for the subscriber 126 based on the selection. Alternatively, the mobile device 124 can render the device configuration based on the selection. At step 104, the device configuration can then be provided to the reservation and notification system 118, for example. Thus, in accordance with one embodiment, the subscriber 126 can use the mobile device 124 to generate a device configuration that indicates the devices the subscriber elects to receive availability notifications from.

According to example embodiments, at step 104, the device configuration generated by the subscriber 126 can be provided, via the mobile device 124, to the wireless broadcast network 116. As described above, the wireless broadcast network 116 can store the configuration, provided at step 104, in a reservation and notification system 118. Additionally, at step 104, one or more characteristics such as the location, date, time, or the like of the mobile device 124 may be provided to the reservation and notification system 118 such that the reservation and notification system 118 can use the characteristics to determine which devices to provide in the configuration interface and to determine whether to broadcast an availability notification to a mobile device, which will be described in more detail below.

Figure 2:
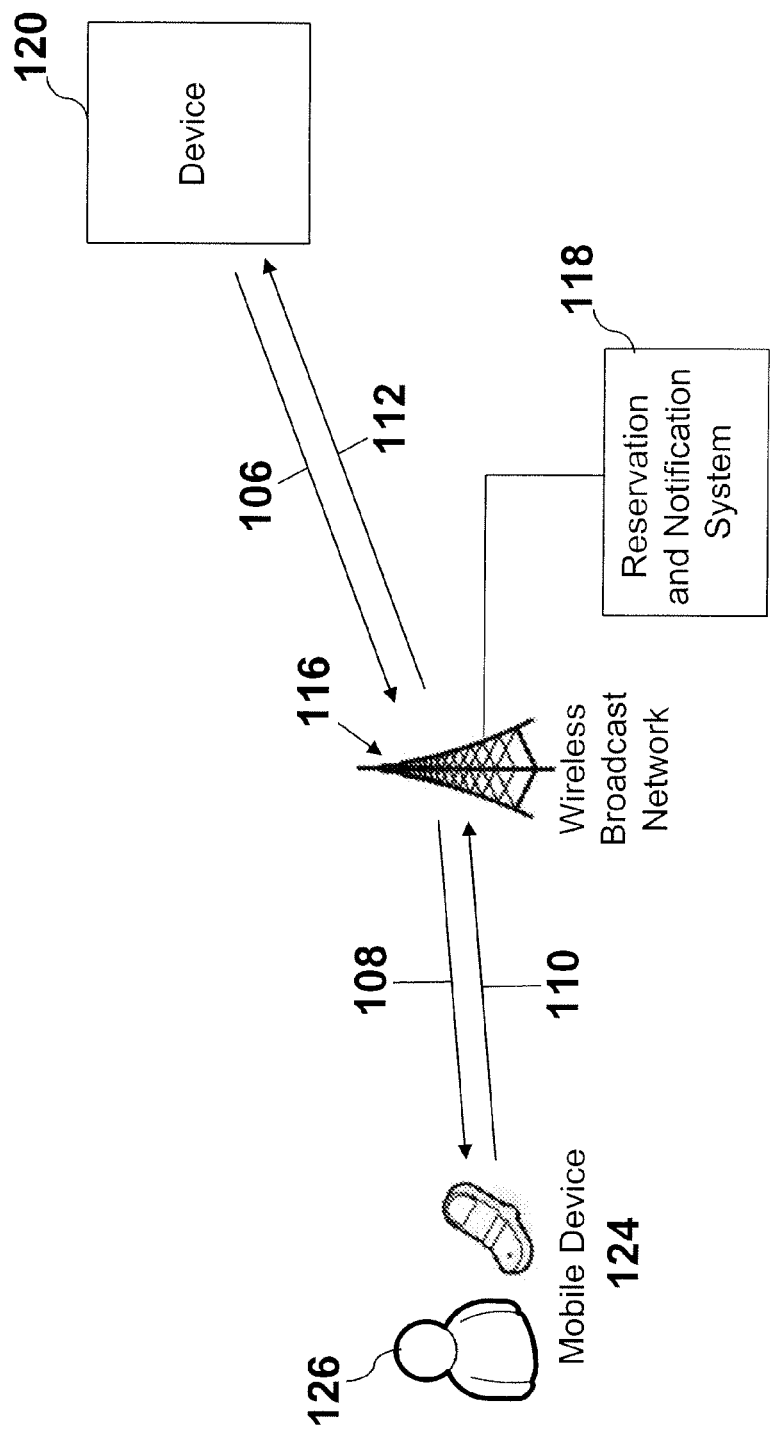
FIG. 2 is a flow diagram of an example system and process for reserving a device and for providing a device availability notification to a mobile device.

FIG. 2 is a flow diagram of an example system and process for reserving a device and for providing a device availability notification to a mobile device. As shown in FIG. 2, a device 120 can be in communication with the reservation and notification system 118. For example, the device 120 can be connected to the reservation and notification system 118 by any wired or wireless technology including Internet connectivity, GSM, CDMA, WiFi, WiMAX, Bluetooth protocol, or the like. According to one embodiment, the device 120 can be in communication with the reservation and notification system 118 via the wireless broadcast network 116.

The device 120 can include any device that can be reserved and can provide availability notifications. For example, the device 120 can include a washing machine, a dryer, workout equipment, a parking meter, a computer access terminal, an electronic kiosk, or any other suitable device that can be reserved by the subscriber or that can provide notification regarding the device's availability.

At step 106, the device 120 can provide a notification indicating whether the device 120 is available or unavailable to be used to wireless broadcast network 116, for example. Upon receipt of the availability notification, the wireless broadcast network 116 can determine whether to provide such an availability notification to the mobile device 124. For example, as described above, the wireless broadcast network 116 can include a reservation and notification system 118 that can be used to determine whether notifications provided by devices such as device 120, at step 106, should be provided to particular mobile devices, which will be described in more detail below.

At step 108, the wireless broadcast network 116 can broadcast the notification indicating the availability of the device 120 to the mobile device 124 based on the determination by the reservation and notification system 118. That is, according to one embodiment, the reservation and notification system 118 can determine which notifications received by the wireless broadcast network 116, at step 106, correspond to the devices in the device configuration established by the subscriber 126, for example. The wireless broadcast network 116 can then broadcast the notification to the mobile device 124 at step 108.

According to one embodiment, the wireless broadcast network 116 can broadcast the notification to the mobile device 124 via a notification and/or reservation interface. The notification and/or reservation interface can be received and displayed by the mobile device 124 such that the subscriber of the mobile device can view which devices such as device 120 may be available for use and/or reservation. The subscriber can then interact with the notification and/or reservation interface to reserve the available device, which will be described in more detail below. According to example embodiments, the notification and/or interface may be provided to the mobile device 124 as a text message, a web page, an SMS message, or the like.

At step 110, the wireless broadcast network 116 can receive a selection of a device to reserve that may be provided by the subscriber 126 via the notification and/or reservation interface. The selection may include a reservation code input by the subscriber 126, a selection of a reservation button to reserve a device, a time or date selection input by the user to reserve the device, or the like. The reservation and notification system 118 can then determine whether to reserve the device 120 based on the selection. For example, based on the selection, the reservation and notification system 118 can determine whether to reserve the device for immediate use or whether to schedule use of the device for a future time. Additionally, the reservation and notification system 118 can determine whether to provide a notification and reservation option to the next subscriber in a queue for the device 120, if based on the selection, the subscriber 126 elects to not reserve the device.

At step 112, the reservation and notification system 118 can provide a reservation indication such as scheduling information to the device 120. The subscriber 126 can then go to the location of the device 120 at the specified reservation time, for example. In one embodiment, the subscriber 126 can enter activation information such as a code, a password, a confirmation number, or the like than can be provided by the reservation and notification system 118 to the mobile device 124 upon completing the reservation. Upon entering the activation information, the device 120 can be activated for use by the subscriber 126 at the reserved time.

Figure 3:
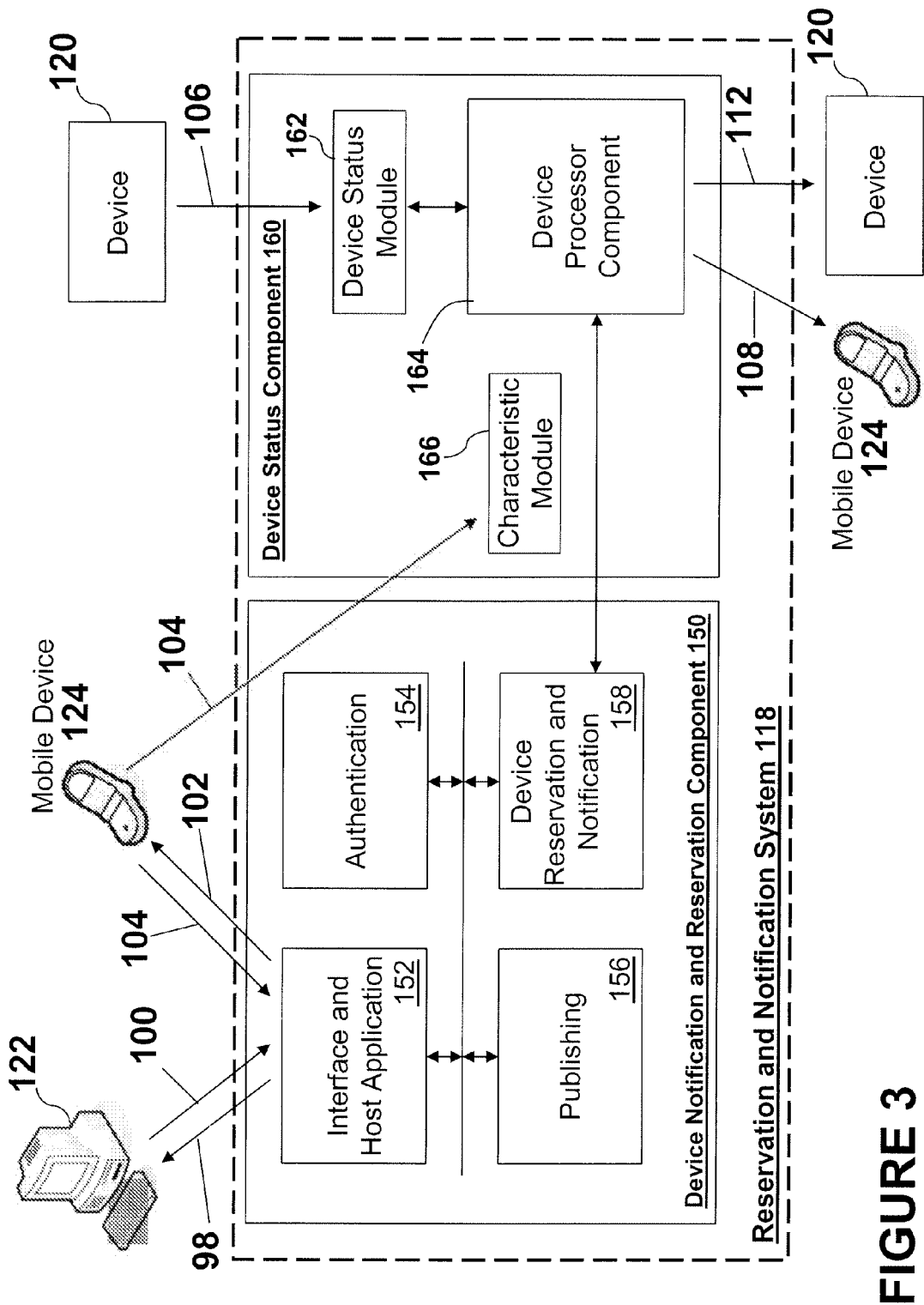
FIG. 3 depicts an example embodiment of a reservation and notification system for providing notification and reserving devices based on a device configuration and/or a characteristic.

FIG. 3 depicts an example embodiment of a reservation and notification system for providing notification and reserving devices based on a device configuration and/or a characteristic. The reservation and notification system 118 can be implemented as an independent component that can be in operative communication with other components of the wireless broadcast network such as the MSC, the HLR, or the like described below in FIGS. 6-8. Alternatively, the reservation and notification system 118 can be implemented as a component within the MSC, the HLR, or the like as described below in FIGS. 6-8. For example, the reservation and notification system 118 can be a feature added to HLR 774 depicted in FIG. 6. Thus, HLR 774 can receive and store a device configuration for a subscriber and then can route that configuration to the reservation configuration system such that the reservation configuration system can determine which availability notifications to provide to a subscriber and can determine whether to reserve a device for the subscriber. Additionally, the functionality of the reservation and notification system 118 can be performed by any suitable hardware and/or software or any combination thereof within HLR 774, for example.

Thus, according to example embodiments, the reservation and notification system 118 can be implemented using a variety of techniques and hardware components including, but not limited to, servers, databases, microchips, storage devices, processors, or programmed modules. Furthermore, as described above, the reservation and notification system 118 can be implemented as an independent component of the wireless broadcast network 116, as a separate component within existing components in the wireless broadcast network 116, and/or using existing components within the wireless broadcast network 116.

The reservation and notification system 118 can also include any combination of systems and sub-systems. According to one embodiment, the reservation and notification system 118 can include a device notification and reservation component 150 and a device status component 160 that can be in operative communication with the device notification and reservation component 150.

The device notification and reservation component 150 can include any number of systems and subsystems such as an interface and host application 152, an authentication module 154, a publishing module 156, and a device reservation and notification module 158. The interface and host application 152, authentication module 154, publishing module 156, and device reservation and notification module 158 can be in operative communication with each other via, for example a bus or any other subsystem that can transfer data between components such as the modules in the device notification and reservation component 150.

The interface and host application 152 of the device notification and reservation component 150 can interface with the electronic device 122 and/or the mobile device 124 to provide communication between, for example, the electronic device and various components and features of the device notification and reservation component. The interface and host application 152 can include software components such as operating systems, Web-based management applications, or the like such that the interface and host application 152 can provide the overall infrastructure and can be the primary consumer of device configurations, characteristics, availability notifications, reservation options and queues, or the like that can be stored by the device notification and reservation component 150. The interface and host application 152 can maintain its own processes, such as user management, and/or rules required to make intelligent use of the configurations, characteristics, or the like provided by the subscriber, electronic device, and/or mobile device. The interface and host application 152 can also serve to interact and interface with the other functional components of the device notification and reservation component 150 including the authentication module 154, publishing module 156, and device reservation and notification module 158.

Additionally, the interface and host application 152 can present a Web interface to the subscriber such as subscriber 126 via the electronic device 122 and/or the mobile device 124. For example, the interface and host application 152 can provide a configuration interface to handle the submission of configurations generated by a subscriber such as subscriber 126 using the electronic device 122 and/or the mobile device 124. Additionally, the interface and host application 152 can provide a notification interface that indicates the availability of a device and a reservation interface to handle the submission of reservation options provided by a subscriber such as subscriber 126 using the mobile device 124.

According to one embodiment, the interface and host application 152 can provide a user management function that can be responsible for maintaining the association of subscribers with device configurations that can be provided by each of the subscribers. Thus, the interface and host application 152 can receive a request from a subscriber to create a device configuration and provide a display such as a Web page that can include one or more devices configured to provide availability notifications that can be selected by the subscriber to create the device configuration, according to an example embodiment.

The authentication module 154 can include any combination of hardware components such as processors, databases, storage drives, registers, cache, RAM memory chips, data buses, or the like and/or software components such that the authentication module 154 can provide a mechanism for authentication of a subscriber before a device configuration, a notification and/or a reservation can be provided by a subscriber and received by the reservation and notification system 118. Typically, subscribers such as subscriber 126 are authenticated by supplying a credential such as an account number, username, Personal Identification Number (PIN), password, or the like before access to the reservation and notification system 118 can be granted.

The device notification and reservation component 150 can also include the publishing module 156. The publishing module 156 can include any combination of hardware components such as processors, databases, storage drives, registers, cache, RAM memory chips, data buses, or the like and/or software components. Processes internal to the notification and reservation component can use the publishing module 156 to manipulate, display, or manage data such as information for devices available to be selected by the user to receive availability notifications from, reservation options for such devices, availability notifications for such devices, device configurations created by a subscriber that indicates the devices the subscriber wishes to receive availability notifications from, or the like that can be stored in the device notification and reservation component 150, for example. The publishing module 156 can be used to receive and deliver data for such information in a variety of ways including, but not limited to, Hypertext Transfer Protocol (HTTP) and/or Secure Hypertext Transfer Protocol (HTTP/S) for simple Web-based access, Simple Main Transfer Protocol (SMTP) for e-mail notifications of such data, Web Services/Simple Object Access Protocol (SOAP) for a programmatic way to access such data, and Sharepoint for online review and collaboration of such data. For example, according to one embodiment, the publishing module 156 can interfaces displays such as Web pages, SMS messages, text messages, electronic messages, or the like that can be delivered to the subscriber using the electronic device 122 and/or the mobile device 124 via, for example, HTTP through the interface and host application 152. In an example embodiment, the subscriber can interact with the interfaces to create a device configuration, to view an availability notification, and/or to reserve a device.

According to one embodiment, the device notification and reservation component 150 can further include the device reservation and notification module 158. The device reservation and notification module 158 can be configured to store device configurations corresponding to the devices the mobile device 124 can be configured to receive availability notifications from and to determine whether one or more devices should be provided to the subscriber as options to receive availability notifications from based on a characteristic of the mobile device. Additionally, the device reservation and notification module 158 can be configured to store a reservation queue for each of the devices that can be reserved and to determine whether the mobile device 124 is eligible to reserve a device. The device reservation and notification module 158 can include, for example, a database, RAM memory chips, cache, registers, hard drives, or any other suitable hardware components designed to store data such as the one or more configurations. According to one embodiment, the device configurations that can be stored in the device reservation and notification module 158 can be indexed by the credential such as the account number, username, Personal Identification Number (PIN), password, or the like that can be provided by the subscriber to access the reservation and notification system 118.

As described above with regard to FIG. 1, the subscriber can generate a device configuration using the electronic device 122 and/or the mobile device 124. At step 100 and/or step 104, such a device configuration can be provided to and received by the device notification and reservation component 150. For example, a configuration interface such as a web page can be generated using publishing module 156. Such a configuration interface can illustrate the one or more devices that can be selected by a subscriber for his or her configuration and that can be reserved by the subscriber. The interface can also be provided to the electronic device 122 and/or mobile device 124 through the interface and host application 152 such that the subscriber 126 can interact with the interface and submit new and/or modified configurations.

According to another embodiment, as described above with regard to FIG. 2, the subscriber can receive an availability notification for a device in his or her device configuration and can reserve a device using the mobile device 124. For example, at step 108, the subscriber 126 can be provided with a notification and/or reservation interface in which the subscriber can select a device to reserve. The reservation selection can then be received by the device notification and reservation component 150 such that the reservation and notification system 118 can determine whether to reserve a device.

In one embodiment, as described above, the reservation configuration system 118 can further include a device status component 160 that can be in operative communication with, for example, the device reservation and notification module 158 of the device notification and reservation component 150.

As shown in FIG. 3, the device status component 160 can include a device status module 162. The device status module 162 can store device information such as the location of a device such as the device 120, the date and the time registered on a device such as the device 120, device identifiers of a device such as the device 120, and availability notifications received from a device such as the device 120 that can be communication with the reservation and notification system 118. For example, the device status module 162 can store location information for the device 120, an identifier for the device 120 and an availably notification for the device 120 that may be provided to the wireless broadcast network 116, at step 106. The device status module 162 can include, for example, RAM memory chips, registers, hard drives, or any suitable hardware designed to store data. Thus, device status module 162 can be in communication with the device 120 such that the device status module 162 can receive and store availability notifications as well as identifying information for the device 120.

The device status component 160 can further include a characteristic module 166. According to one embodiment, the characteristic module 166 can be configured to store information for determining whether mobile device 124 includes a characteristic such as location, time, date, or the like that indicates an availability notification of the device 120 provided, at step 106, is appropriate for receipt by the mobile device 124. For example, the characteristic module 166 can include a database, RAM memory chips, registers, hard drives, or any suitable hardware designed to store data. The characteristic module 166 can receive and store one or more characteristics provided by the mobile device 124 at step 104, for example. According to one embodiment, the characteristic module 166 can also be in operative communication with the HLR, the MSC, or any other components of the wireless broadcast network, as described below in FIGS. 6-8, such that the characteristic module 166 can be updated by the network provider with additional characteristics that can be used to determine whether to provide an availability notification for the device 120 and/or whether to enable a subscriber to reserve the device 120.

The device status component 160 can also include device processor component 164. The device processor component 164 can be in operative communication with the device status module 162, the characteristic module 166, and the device reservation and notification module 158, as shown in FIG. 3. The device processor component 164 can include, for example, a standard processor, a specialized processor, or the like. The device processor component 164 can engage in notification and/or reservation analysis to determine whether to provide the availability notification received the device 120, at step 106, to the mobile device 124.

According to one embodiment, the device processor component 164 can compare the device identifier or any other suitable information received from the device 120 that can be stored in the device status module 162 with a stored identifier for each of the devices the subscribed has elected to receive availability notifications from based on the subscriber's device configuration that can be stored in the device reservation and notification module 158. If the device matches a device the subscriber has elected to receive availability notifications from as indicated by the device configuration, the device processor component 164 can provide the availability notifications received, at step 106, to the mobile device 124, at step 108.

Additionally, the device processor component 164 can compare a characteristic stored in the characteristic module 166 with location information that may be provided by the devices such as device 120, at step 106, and may be stored in the device status module 162. In one embodiment, the mobile device 164 can provide the location of the mobile device, at step 104. The location can be received and stored by the characteristic module 166. The location can then be compared to location information for the device 120 stored in the device status module 162 to determine whether an availability notification provided by the device 120, at step 106, is appropriate for receipt by the subscribe of mobile device 124. For example, the mobile device 124 may be located at a Location A whereas the device 120 may be located 30 miles from Location A at a Location B. Such characteristics can be provided to the characteristic module 166, at step 104, and the device status module 162, at step 106. The device processor component 164 can compare these locations to determine whether, for example, the mobile device 124 is suitable to receive an availably notification for the device 120. For example, if the device 120 is available for use in 10 minutes, and the mobile device 124 provides information that indicates the mobile device 124 is 30 miles from the device 120, the device processor component 164 can determine not to provide the availably notification of the device 120 to the mobile device 124.

The device processor component 164 can be used to determine whether to provide information for the device 120 to the subscriber, at steps 108 and 110. For example, a plurality if devices may be in communication with the reservation and notification system 118 via the wireless broadcast network 116. The devices can have locations throughout the world. The device processor component 164 can compare the device location with the typical location of the mobile device such as a registered address associated with the subscriber's account corresponding to the mobile device to determine whether to provide a specific device to the electronic device 122 and/or the mobile device 124 to establish the device configuration. That is, a device may not be included on the configuration interface if, for example, the device is located in Cincinnati, and the subscriber's listed address is located in Philadelphia.

Additionally, in an example embodiment, the device processor component 164 can be used to provide a reservation notice to the device 120. For example, as described above, upon receipt that the device 120 is available for use, the subscriber can interact with a reservation interface that can be provided to reserve the device for immediate use. According to one embodiment, the reservation interface can be provided to the subscriber via his or her mobile device, for example, even if the device 120 is currently unavailable. The subscriber can select to reserve the device, via the reservation interface, at a future time based on the device's availability. Upon receiving the reservation information from the mobile device 124, the device processor 164 can provide the reservation notice to the device 124, at step 112, such that the device 120 can be reserved for immediate and/or future use. In one embodiment, the device processor component 164 can provide the reservation notices, at step 112, to the device 120 periodically in, for example, a reservation queue.

Figure 4:
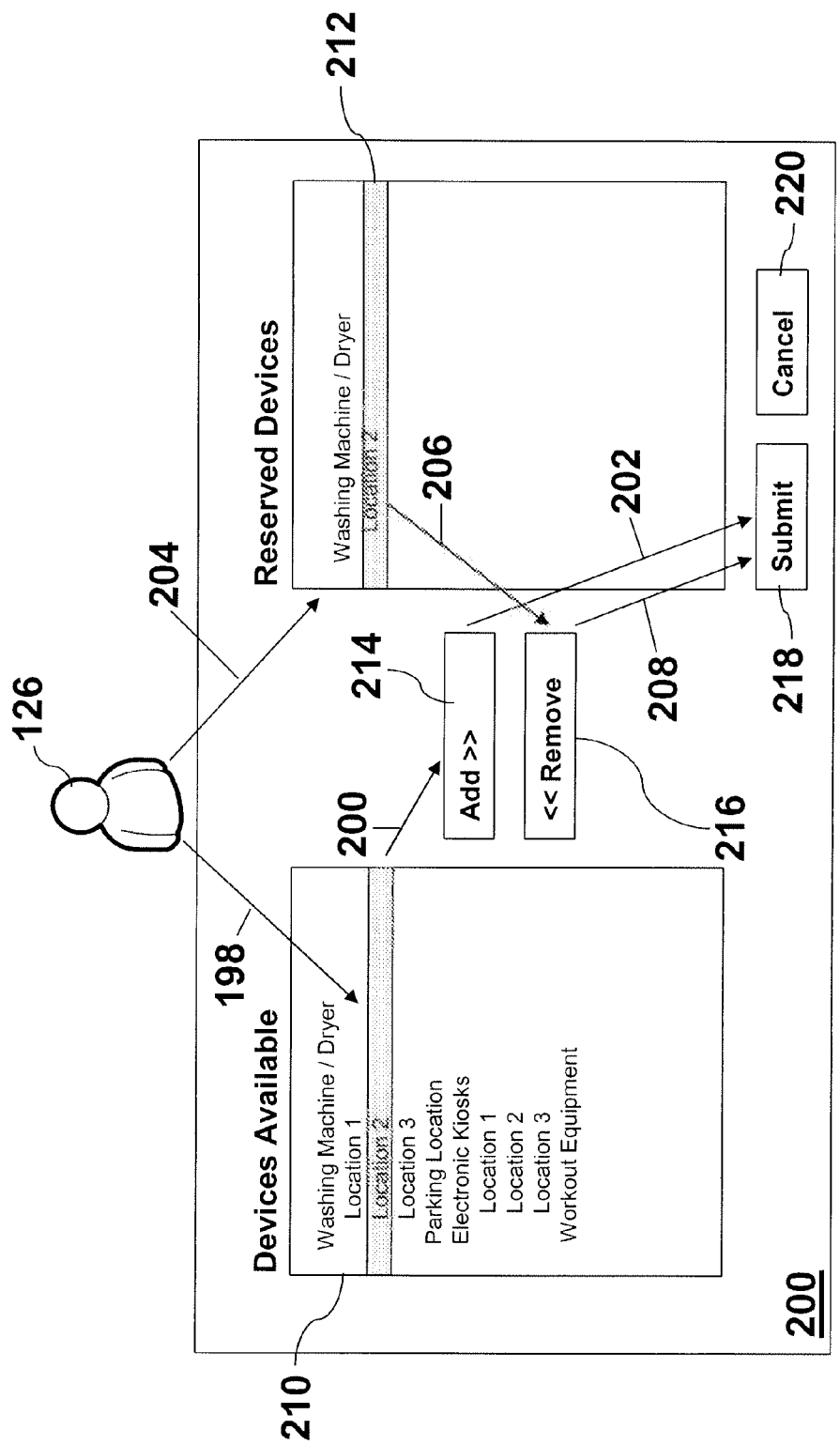
FIG. 4 depicts an example embodiment of an interface provided to establish a configuration for device availability notifications received by a mobile device.

FIG. 4 depicts an example embodiment of an interface provided to establish a device configuration for device availability notifications received by a mobile device. As shown in FIG. 4, a configuration interface 200 can include a device available block 210 that indicates the devices that the subscriber can elect to receive availability notifications from and can, for example, reserve services from. The device available block 210 can include a general device such as washing machine, dryer, parking location, computer access terminal, electronic kiosk, workout equipment, or the like that can provide availability notifications and that can be reserved. Additionally, the device available block 210 can include specific devices at one or more locations. For example, as shown in FIG. 4, the device available block 210 can include a specific washer and/or dryer at a specific location 1. As described above, the devices that may be shown in the devices available block 210 may be dynamically generated by the reservation and notification system based on a characteristic of the mobile device of the subscriber 126 such as the location of the mobile device.

The configuration interface 200 can also include a reservation and notification block 212. The reservation and notification block 212 can include a list of devices the subscriber wishes to receive notifications from and wishes to reserve for use. According to one embodiment, the subscriber 126 can interact with the devices available block 210 to establish, create, and/or modify the device configuration. At step 198, the subscriber 126 can select a general device to receive notifications from each device locations of that general device type. Additionally, at step 198, the subscriber 126 can select a specific location of a device to receive notifications from and reserve. For example, at step 198, the subscriber 126 can use an input device connected to an electronic device and/or the mobile device to highlight the a location of a device for which the subscriber wishes to receive notifications from and reserve. At step 200, the subscriber 126 can then select an add button 214 to add the selected device and location of such a device to the reservation and notification block 212, for example.

Additionally, at step 204, the subscriber 126 can select a location of a device in his or her device configuration that can be displayed in the reservation and notification block 212. At step 206, the subscriber 126 can click a remove button 216 to remove a device and/or location from his or her device configuration. The subscriber 126 can interact with the configuration interface 200 to add additional devices, as described above.

Once the subscriber 126 has finished creating and/or updating the configuration, the subscriber can select a submit button 218 on the configuration interface 200, at step 202 and/or step 208. The configuration information can then be transmitted to, for example, the network provider. For example, at step 100 in FIG. 1, the device configuration can be provided by the electronic 122 to wireless broadcast network 116 operated by the network provider after the submit button 218 is selected at step 202 and/or step 208. Additionally, at step 104 in FIG. 1, the device configuration can be provided by the mobile device 124 to the wireless broadcast network 116 operated by the network provider after the submit button 218 is selected at step 202 and/or step 208. The subscriber 126 can cancel creating and/or modifying a configuration by selecting a cancel button 220 on the configuration interface 200.

Figure 5:
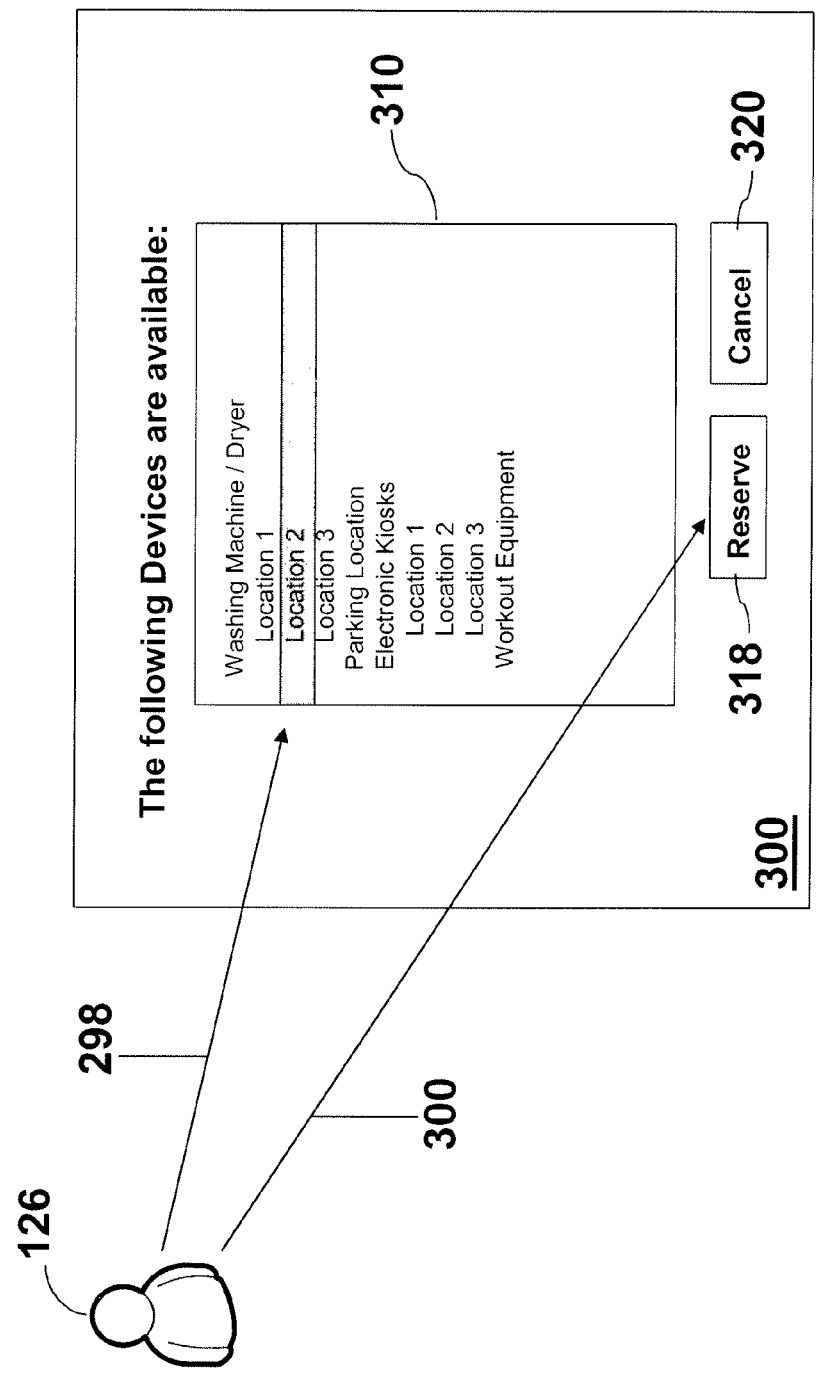
FIG. 5 depicts an example embodiment of an interface provided to reserve and/or schedule an available device.

FIG. 5 depicts an example embodiment of an interface provided to reserve and/or schedule an available device. As shown in FIG. 5, a reservation interface 300 can include a device notification and availability block 310 that indicates the devices that are available to be reserved, for example. The device available block 310 can illustrate the locations of the devices available to be reserved. In an example embodiment, the reservation interface 300 can be provided when a device becomes available such that the subscriber 126 can reserve the device for immediate use. Additionally, the reservation interface 300 can be provided to the subscriber 126 via his or her mobile device separately from an availability notification interface that indicates a device is available. For example, the reservation interface 300 can be provided to the subscriber 126 at a prespecified time or at the request of the subscriber such that the subscriber 126 can reserve a device for future use based on the device's availability.

According to one embodiment, the subscriber 126 can interact with the device notification and availability 310 to reserve a specific device. At step 298, the subscriber 126 can select a specific location of a device to reserve that device. For example, at step 298, the subscriber 126 can use an input device connected to the mobile device to highlight the a location of a device the subscriber wishes reserve.

At step 300, the subscriber 126 can then select a reserve button 318 to reserve the selected devices at the selected locations. For example, upon selecting the reserve button 318, a reservation selection corresponding to the devices reserved by the subscriber 126 can be transmitted to, for example, the network provider. For example, at step 110 in FIG. 2, the reservation selection can be provided by the mobile device 124 to the wireless broadcast network 116 operated by the network provider after the reserve button 218 is selected at step 300. The subscriber 126 can cancel reserving a device by selecting a cancel button 320, for example.

The following description sets forth some exemplary telephony radio networks and non-limiting operating environments for broadcasting secure messages. The below-described operating environments should be considered non-exhaustive, however, and thus the below-described network architectures merely show how availability notifications and reservation for devices may be incorporated into existing network structures and architectures. It can be appreciated, however, that availability notifications and reservation for devices can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS alert messages can be applied independently of the method for data transport, and do not depend on any particular network architecture, or underlying protocols.

Figure 6:
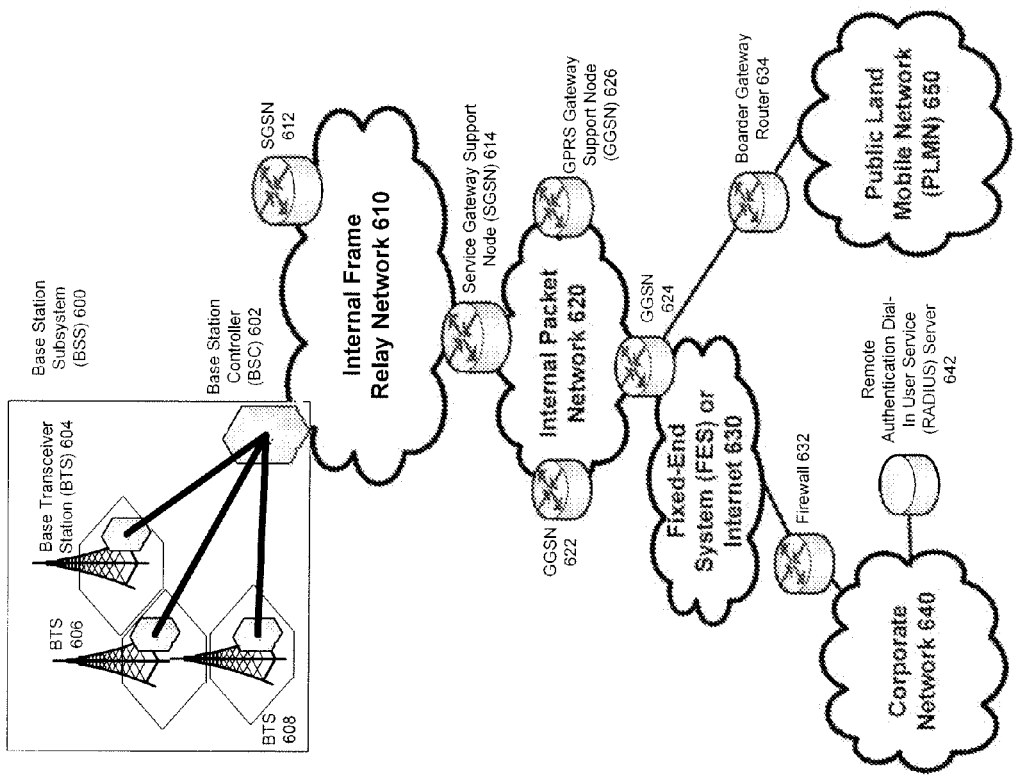
FIG. 6 depicts an overall block diagram of an exemplary packet-based mobile cellular network environment, such as a GPRS network, in which the system for providing alert messages based on a characteristic and/or configuration can be practiced.

FIG. 6 depicts an overall block diagram of an exemplary packet-based mobile cellular network environment, such as a GPRS network, in which the system for implementing a configuration based EAS alert message can be practiced. In an example configuration, the emergency alert network 110 and/or the wireless broadcast network 116 are encompassed by the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 7:
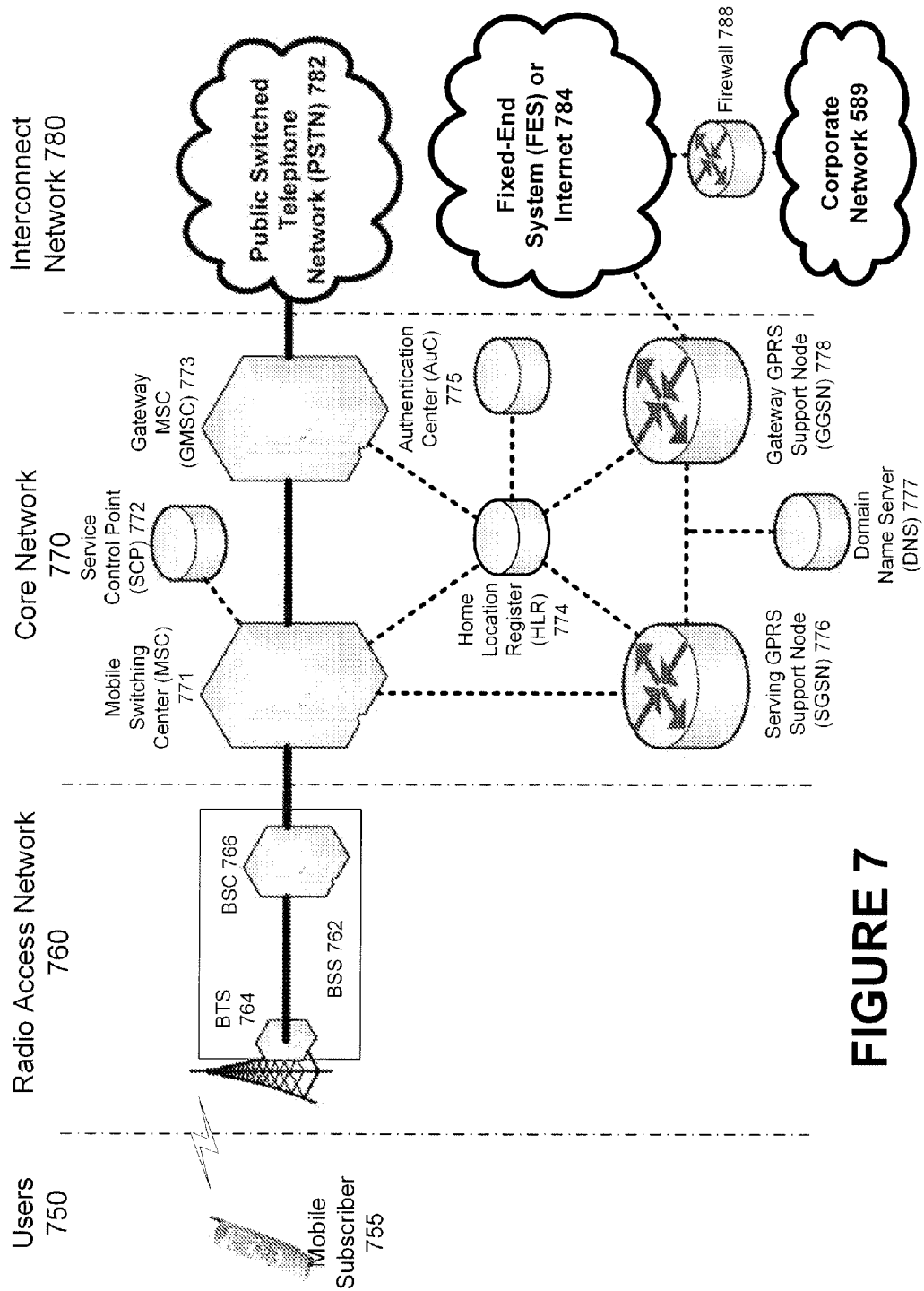
FIG. 7 illustrates an architecture of a typical GPRS network as segmented into four groups.

FIG. 7 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 124, used by an end user of the mobile cellular service. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of a configuration based EAS alert message can include but are not limited to Gateway GPRS Support Node tables, Fixed End System router tables, firewall systems, VPN tunnels, and any number of other network elements as required by the particular digital network.

FIG. 8 illustrates another exemplary block diagram view of a GSM/GPRS/IP multimedia network architecture 800 in which a configuration based EAS alert message can be incorporated. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of establishing configurations and/or characteristics that can be used determine whether to broadcast EAS alert messages have been described in connection with various computing devices, the underlying concepts can be applied to any computing device or system capable of establishing configurations and/or characteristics that can be used determine whether to broadcast EAS alert messages. The various techniques described herein can be implemented in connection with hardware or software or, where appropriate, with a combination of both. Thus, the methods and apparatus of establishing configurations and/or characteristics that can be used determine whether to broadcast EAS alert messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing configurations and/or characteristics that can be used to filer EAS alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus of establishing device configurations, providing notifications of device availability, reserving devices, and scheduling device use also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for establishing device configurations, providing notifications of device availability, reserving devices, and scheduling device use. When implemented on a general-purpose processor, the program code combines with the processor to provide a unique apparatus that operates to invoke the functionality of establishing device configurations, providing notifications of device availability, reserving devices, and scheduling device use. Additionally, any storage techniques used in connection with reservation selections and information, device information, device availably notifications, or the like can invariably be a combination of hardware and software.

While establishing device configurations, providing notifications of device availability, reserving a device, and scheduling device use has been described in connection with the various embodiments of the various figures, it should be understood that other similar embodiments can be used or modifications and additions can be made to the described embodiment for performing the same functions described herein. For example, one skilled in the art will recognize that a system of establishing device configurations, providing notifications of device availability, reserving devices, and scheduling device use as described can apply to any environment, whether wired or wireless, and can be applied to any number of devices connected via a communications network and interacting across the network.

What is claimed:

1. A method comprising:
receiving, from a mobile device, a characteristic associated with the mobile device, the characteristic comprising a location of the mobile device;
determining, in accordance with the characteristic, at least one device among a plurality of devices for inclusion in an interface, each of the at least one device capable of providing a respective availability indication representative of an availability of the at least one device;
providing the interface to the mobile device, the interface comprising an indication of respective selectable representations corresponding to each of the at least one device that are selectable via highlighting on a display of the mobile device;
receiving a notification selection, from the mobile device, the notification selection indicative of a selected device of the at least one device;
providing an availability indication pertaining to the selected device, the availability indication based on the received notification selection;
generating a device configuration based on the received notification selection;
receiving a credential corresponding to a subscriber of the mobile device;
associating the device configuration with the credential; and
storing the associated device configuration and credential.

2. A method in accordance with claim 1, wherein the selected device comprises at least one of a washing machine, a dryer, workout equipment, a parking meter, or a computer access terminal.

3. A method in accordance with claim 1, further comprising:
receiving an availability indication from a respective one of the plurality of devices;
determining whether the respective one of the plurality of devices corresponds to the selected device; and
if the respective one of the plurality of devices corresponds to the selected device, providing the availability indication to the mobile device via a wireless broadcast.

4. A method in accordance with claim 3, wherein determining whether the respective one of the plurality of devices corresponds to the selected device comprises comparing an identifier of the respective one of the plurality of devices with stored identifiers in the device configuration.

5. A method in accordance with claim 4, wherein the availability indication is provided to the mobile device if the identifier of the respective one of the plurality of devices matches at least one of the stored identifiers in the device configuration.

6. A method in accordance with claim 1, further comprising:
providing a reservation interface to the mobile device, the reservation interface representative of respective reservation options associated with the selected device;
receiving a reservation selection via the reservation interface, the reservation selection indicative of a selection of a particular reservation option;
determining whether to reserve the selected device based on the reservation selection; and
reserving the selected device if, based on the determination, the reservation selection indicates to reserve the selected device.

7. A system comprising:
a status module configured to:
store a device identifier associated with a first device, the device identifier indicating that the first device is configured to generate availability notifications indicative of an availability of the first device; and
store respective availability notifications generated by the first device;
a reservation and notification module configured to store a device configuration associated with a mobile device, the device configuration indicating that availability notifications generated by the first device should be provided to the mobile device; and
a processor communicatively coupled to both the status module and the reservation and notification module, the processor configured to:
provide a configuration interface to the mobile device, the configuration interface comprising an indication of a selectable representation of the first device that is selectable via highlighting on a display of the mobile device;
receive a selection from the mobile device;
generate, responsive to receiving the selection, the device configuration;
cause the device configuration to be stored in the reservation and notification module;
receive an availability notification generated by the first device;
responsive to receiving the availability notification, determine whether the availability notification should be provided to the mobile device; and
if, based on the determination, the availability notification should be provided to the mobile device, provide the availability notification to the mobile device by wireless broadcast.

8. A system in accordance with claim 7, wherein determining whether the availability notification should be provided to the mobile device comprises accessing the device configuration.

9. A system in accordance with claim 7, wherein the processor is further configured to receive a characteristic associated with the mobile device.

10. A system in accordance with claim 9, wherein the characteristic is indicative of at least one of a location of the mobile device, a date, or a time.

11. A system in accordance with claim 7, wherein the configuration interface comprises respective selectable representations of a plurality of devices that includes the first device.

12. A system in accordance with claim 9, wherein the processor is further configured to select the first device for inclusion in the configuration interface based at least partially on the characteristic.

13. A mobile device comprising:
a processor; and
memory coupled to the processor, the memory having stored thereon executable instructions that when executed by the processor cause the processor to effectuate operations comprising:

providing a characteristic associated with the mobile device to a reservation and notification system, the characteristic comprising a location of the mobile device;

receiving, from the reservation and notification system, a configuration interface generated in accordance with the characteristic, the configuration interface representative of at least one device capable of providing an availability indication representative of an availability of the at least one device;

displaying, on the mobile device, respective selectable representations corresponding to each of the at least one device, the selectable representations being selectable via highlighting on a display of the mobile device;

receiving, on the mobile device, a notification selection corresponding to a selected device of the at least one device;

rendering a device configuration based on the notification selection, the device configuration indicating that availability notifications generated by the selected device should be provided to the mobile device; and providing the device configuration to the reservation and notification system.

14. A mobile device in accordance with claim 13, the operations further comprising:

rendering a reservation interface received from a network provider, the reservation interface representative of those of the at least one device that can be reserved;

receiving a reservation selection corresponding to at least one reservation option available for a reservable device of the at least one device, the at least one reservation selection provided via the reservation interface; and providing, via a wireless broadcast, the reservation selection to the network provider, wherein the network provider reserves the reservable device based on the reservation selection.

15. A mobile device in accordance with claim 14, the operations further comprising establishing a communication session with the network provider, wherein the mobile device provides the reservation selection to the network provider during the communication session.

16. A mobile device in accordance with claim 14, wherein the reservation interface includes availability indications received from respective devices of the at least one device.

17. A mobile device in accordance with claim 14, wherein the at least one reservation option includes at least one of reserve now, reserve at a later time, or do not reserve.

18. A method in accordance with claim 6, wherein the selected device is currently unavailable and the particular reservation option comprises a reservation for use of the selected device at a time when the selected device is available.

19. A mobile device in accordance with claim 14, wherein the reservable device is currently unavailable and the reservation selection comprises a reservation for use of the reservable device at a time when the selected device is available.

* * * * *